July 30, 1935.  O. S. EASTERLING  2,009,544
OILING SYSTEM
Filed Jan. 2, 1934
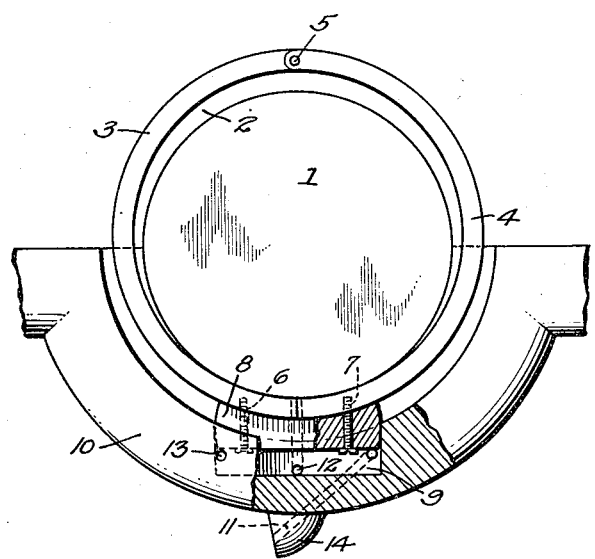
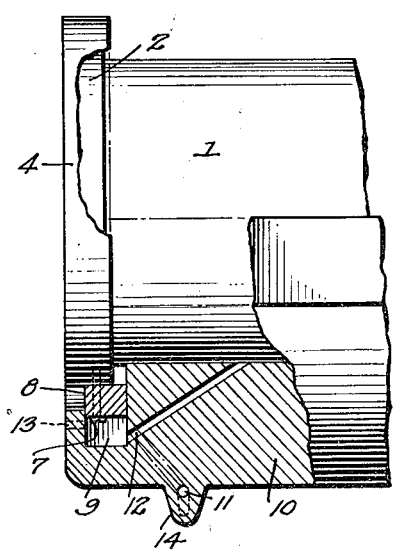
Inventor:
O S Easterling Patented July 30, 1935

2,009,544

UNITED STATES PATENT OFFICE 2,009,544

OILING SYSTEM

Ollie Sherman Easterling, Ashland, Oreg.

Application January 2, 1934, Serial No. 704,995

2 Claims. (Cl. 184—27)

The invention relates to improvements in oiling systems generally and more particularly to means for oiling the bearings between the connecting or piston rods and the crank-pins of the crank shaft of an internal combustion motor; the object of the invention being to provide means whereby oil will be taken from the dip-trough and delivered to the connecting rod bearings on the crank-pin or crank shaft pin under pressure, the means insuring a positive lubrication of the connecting or piston-rod bearings at all motor speeds.

In the accompanying drawing which is a part of this specification:

Fig. 1 is an end view of a connecting rod bearing, showing my invention, parts broken away for sake of clarity.

Fig. 2 is a side view of the same, also having parts broken away.

1 is the crank shaft pin. 2 is the eccentric flange or ridge on the crank shaft pin 1. 3 and 4 are the two sections of the ring which is actuated by the eccentric flange 2; these two sections are secured at the top by the screw 5, and at the bottom by screws 6 and 7 which fasten the assembled ring to the plunger 8. Plunger 8 is a segment of a disk concavely truncated to receive the sections of the split ring 3 and 4, and due to the characteristic discal curvature of its lateral edges is free to rock sidewise in chamber 9 and thus follow the lateral shifting of eccentric flange 2 without permitting leakage past the plunger 8 or without binding of the plunger 8 in the chamber 9. This plunger operates in the receptacle 9, which is contained in the connecting-rod cap 10. 11 is the inlet channel conducting the oil from the dip-trough to the receptacle 9. 12 is the outlet channel conducting the oil under pressure from the receptacle 9 to the connecting-rod bearings. 13 is the air vent from the receptacle 9. 14 is the usual lip which dips into the dip-trough in splash systems.

In operation the oil is taken in through the channel 11 to the receptacle 9 as the lip 14 on the bottom of the connecting-rod cap dips into the dip-trough; the air contained in the receptacle 9 is expelled through the vent 13; and as the connecting-rod and crank shaft pin ascend the eccentric flange 2 causes the plunger 8 to press down into the receptacle 9 stopping the receptacle orifice of the channel 11 and the air vent 13, and forcing the oil in the receptacle through the channel 12 to the connecting-rod bearings, completing the discharge of the oil at or about the top of the connecting-rod stroke; and with the down-stroke of the connecting-rod the eccentric flange 2 causes the plunger 8 to lift in the receptacle 9 opening channel 11 and air vent 13.

This means embodies simplicity of construction and insures a constant lubrication under pressure during approximately one-half of the crank shaft pin revolution.

I claim:

1. In a connecting rod bearing oiling system the combination of an eccentric flange on the crank pin, a split ring about said flange, a plunger of the type described attached to said split ring, said plunger contained within a chamber in the connecting rod cap, an inlet extending from a lip underneath said connecting rod cap to said chamber, a vent from said chamber, and a conduit extending from said chamber to the surface of the connecting rod cap bearing.

2. In an oiling system the combination of an eccentric flange on a shaft, a split ring about said flange, a plunger of the type described attached to said split ring, said plunger contained within a chamber in the bearing cap, an inlet conduit extending from an oil supply to said chamber, a vent from said chamber, and a conduit extending from said chamber to the surface of said cap bearing.

OLLIE SHERMAN EASTERLING.